Jan. 22, 1963   E. O. ROE ETAL   3,075,109
ELECTRIC MOTORS
Filed June 4, 1958   2 Sheets-Sheet 1

INVENTORS
Elverton O. Roe
Robert C. Carneck
BY
ATTORNEYS.

Jan. 22, 1963  E. O. ROE ETAL  3,075,109
ELECTRIC MOTORS

Filed June 4, 1958  2 Sheets-Sheet 2

INVENTORS
Elverton O. Roe
BY Robert C. Corneck
ATTORNEYS.

United States Patent Office 3,075,109
Patented Jan. 22, 1963

3,075,109
ELECTRIC MOTORS
Elverton O. Roe, Elyria, and Robert C. Carneck, Lorain, Ohio, assignors to General Industries Company, Elyria, Ohio, an Ohio company
Filed June 4, 1958, Ser. No. 739,744
4 Claims. (Cl. 310—239)

Our invention relates to improvements in the construction of electric motors and generators and more particularly to improvements in methods of making the same.

The present invention involves providing a stator of ferro-magnetic material which has been permanently magnetized, in conjunction with an armature of conventional, wound-coil design. As herein illustrated and described, we show an electric motor having a circumferentially continuous ferrite field which has been premagnetized to provide the effect of conventional pole tips as found in well-known electric motor construction.

An object of our invention is to provide such a motor which obviates the use of coil windings in the motor stator.

Another object of our invention is to provide a stator of the above type which is simple to construct and comprises a substantially reduced number of parts over conventional motor design.

Still another object of our invention is to provide a motor of the above type which is highly durable and efficient in use.

Yet another object of our invention is to provide a motor of the above type having a field flux which is skewed in relation to the armature without physically skewing the armature slots.

Other objects of our invention and the invention itself will become readily apparent from the following description and the accompanying drawings, in which said drawings.

Figure 1:
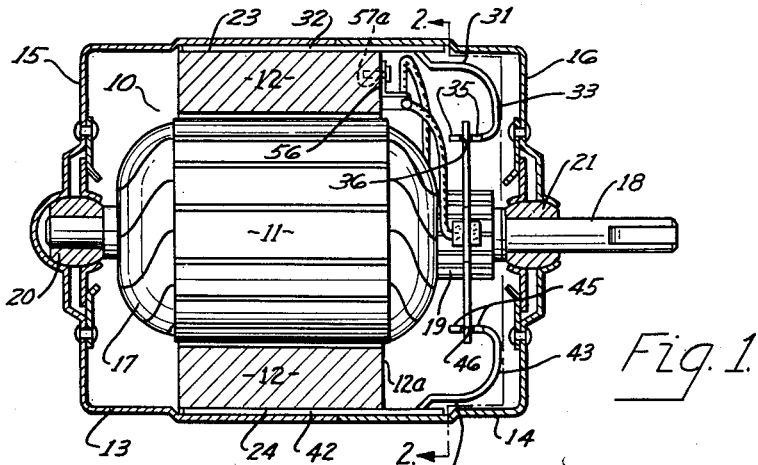
FIG. 1 is a longitudinal section of the motor of our invention.

Referring now to the drawings in all of which like parts are designated by like reference characters, in FIG. 1 we show a motor 10 comprising an armature 11 and a field or stator 12. The motor 10 is encased within a pair of complementary, cup-shaped housing members 13 and 14 having end walls 15 and 16 respectively.

The armature 11 is of conventional design having windings 17 concentrically mounted upon a rotor shaft 18 and having a commutator 19 mounted coaxially with said windings adjacent one end thereof. The rotor shaft 18 is journalled in self-aligning bearings 20 and 21 mounted within the end walls 15 and 16 respectively, the commutator 19 being interposed between the windings 17 and the bearing 21 as illustrated in FIG. 1.

Figure 3:
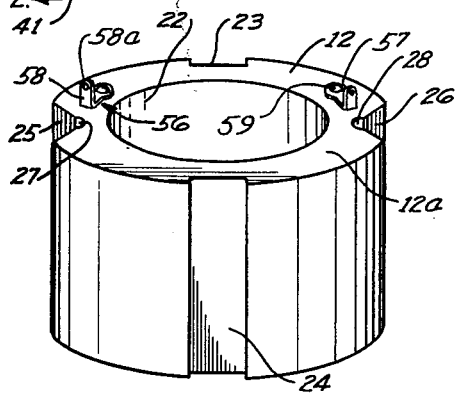
FIG. 3 is a perspective view of the stator of the motor shown in FIG. 1.

The stator 12 comprises a permanent magnet of the ferrite family, cylindrically formed as best shown in FIG. 3. Said stator is centrally longitudinally apertured at 22 whereby the rotor 11 rotates therein and is provided at its outer periphery with a pair of diametrically opposite, longitudinally directed, shallow grooves 23 and 24. The stator 12 is also provided with a pair of diametrically opposite, longitudinal, generally V-shaped grooves 25 and 26 at the outer periphery thereof, said V-shaped grooves being circumferentially disposed at right angles to the grooves 23 and 24. Said V-shaped grooves 25 and 26 intersect longitudinally disposed, cylindrical apertures 27 and 28 respectively adapted to receive bolts 29 and 30 whereby the assembled motor and housings are secured together in a conventional manner.

The shallow grooves 23 and 24 provide means for mounting a pair of brush supports 31 and 41 respectively. The brush support 31 is formed of relatively thin, flat, sheet metal having an elongated body portion 32 and an inwardly offset hook portion 33 at one end thereof. The body portion 32 is adapted to interfit the groove 23 whereby the hook 33 extends beyond the stator 12 and is positioned radially outwardly from the commutator 19.

The free end 34 of the hook 33 is bent inwardly to a plane parallel with the body portion 32 and is provided with laterally oppositely directed arms 35 having openended slots 36 longitudinally and centrally of said arms.

The brush support 41 is substantially identical with the brush support 31 and is provided with a body portion 42, a hook 43, a flat end 44 of said hook, and laterally extending arms 45 slotted at 46.

It will be understood, therefore, that the arms 35 and 45 are diametrically oppositely positioned on either side of the commutator 19 and are substantially and evenly spaced radially therefrom. By means of said arms, a pair of brush holders 50 are mounted to hold a pair of brushes 51 in resilient contact with the commutator 19.

Figure 2:
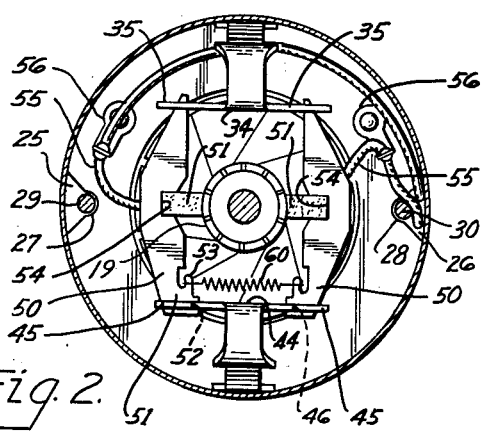
FIG. 2 is a sectional view taken along the line 2—2 of FIG. 1.

The brush holders 50 are made of suitable, nonconducting material in rigid, sheet form adapted to loosely interfit the slots 36 and 46 of the brush supports 31 and 41 respectively. Referring particularly to FIG. 2, said brush holders are provided with lowermost foot portions 51 being inwardly notched at 52 and hooked over the innermost ends of the slots 36 and 46 in the brush supports 31 and 41. Said foot portions have upwardly projecting lugs 53, and a coil spring 60 is attached at either end of said spring to said lugs. By means of the spring 60, the brush holders 50 are biased inwardly about pivot points at the notches 52. The uppermost ends of the brush holders project within the slots 36 of the brush holder arms 35 and are thereby retained in the brush holder 31. The brushes 51 are of conventional design and are adapted to interfit rectangular notches 54 intermediate the ends of the brush holders 50 whereby said brushes are held in resilient contact at diametrically opposite points on the commutator 19.

Brush leads 55 are secured to the brushes in a conventional manner at one end thereof and to lead supports 56 mounted in the stator 12 at the opposite end thereof. Referring particularly to FIGS. 1 and 3, the lead supports 56 are formed of flat sheet metal and comprise body portions 57 and right angularly bent legs 58. The body portions 57 are apertured at 57a and adapted to receive rivets 59 threaded therethrough. The lead supports 56 are secured to the stator 12 by pressing or driving the rivets 59 into a forwardly disposed, transverse surface 12a of said stator, whereby the legs 58 project outwardly therefrom. Apertures 58a are preferably provided in the legs 58 to facilitate securing said leads thereto in a conventional manner such as soldering.

The above detailed construction is possible due to the properties of the ferrite stator 12. Said stator is a non-conductor of electricity thereby permitting the mounting of the lead supports directly to the stator without the use of insulating materials. As hereinbefore disclosed, said stator is a permanent magnet whereby the magnetic properties thereof are fixed during manufacture and do not change thereafter. In this construction, therefore, there is no need for expensive conventional field coils.

The basic ingredients used in making the ferrite stator are light-weight barium and iron oxides in powdered form preferably mixed with a suitable binding agent, for example, a plastic such as phenal formaldehyde. The resulting mixture is pressed into the desired shape under extreme pressure.

We have found, by experimentation, that two types of permanent magnets are particularly suitable for use in the present invention although we anticipate that others would work satisfactorily. The first type is a 100% ceramic magnet composed of barium ferrite, for example, having a coercive force of 1,700 oersteds. The second type is a plastic bonded ceramic magnet comprising, typically, approximately 95% ferrite material and 5% plastic binder having a coercive force of 1,300 oersteds. There are other materials having much higher coercive forces which can also be used with the present invention, and the above are given as examples only.

The ferrite stator may be permanently magnetized by subjecting it to a strong magnetic field. Physically formed pole tips are not necessary in this construction because the pole arc can be established by the magnetizing procedure. Magnetizing of the stator can be limited to particular circumferential areas, and by tapering off the degree of saturation circumferentially, the effect of chamfered field pole tips is achieved. Pole areas may also be magnetized which lie helically in relation to the rotating axis of the stator thereby producing a skewed relationship between the armature and the stator flux concentrations.

The stator of the present invention may be magnetized by various methods, such as an impulse magnetizer of the condenser discharge type or other known methods of magnetizing. A magnetizing shoe may be introduced within the field bore, said shoe adapted to produce the particular magnetic pattern desired. Since the high coercive force of the ferrite material which keeps it from demagnetizing also makes it difficult to magnetize, it is necessary to provide an extremely high magnetomotive force in the magnetizing shoe.

Figure 7:
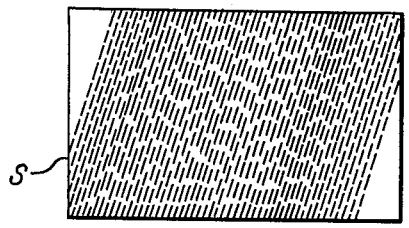
FIG. 7 is a top plan view of the stator of FIG. 6.

In the case of a skewed field pattern, such as that shown in FIG. 7, the magnetizing shoe would be helical in shape where it comes in contact with the field bore during the magnetizing operation. The resultant magnetization pattern in the field would then take the same geometric shape as the shoe. In the case of a field having areas of tapered density (as shown at R in FIGS. 9 and 10), the shoe would be chamfered at the edges to provide a tapered air gap between said shoe and the field bore. Since the flux density varies inversely as the air gap, the resulting magnetizing density would also be tapered and thereby create the effect of physically tapered pole tips.

Figure 6:
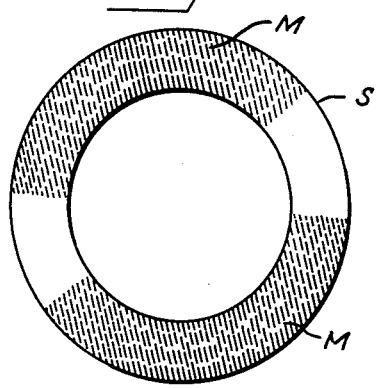
FIG. 6 is a diagrammatic showing of an end view of a stator showing the field flux in dotted lines.
Figure 9:
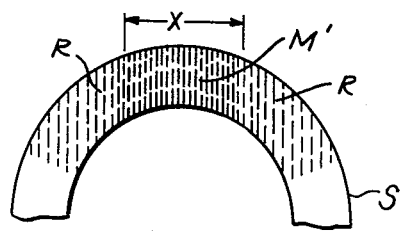
FIG. 9 is a fragmentary diagrammatic showing of an end view of a stator having a modified field flux shown in dotted lines.
Figure 10:
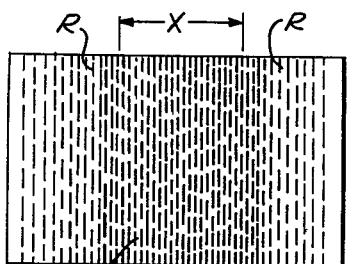
FIG. 10 is a top plan view of the stator of FIG. 9.
Figure 8:
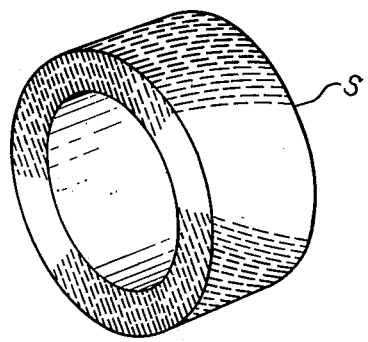
FIG. 8 is a perspective view of the stator of FIGS. 6 and 7.

In FIGS. 6 to 8 we show, in diagrammatic form, a stator S magnetized for use with the present invention and in FIGS. 9 and 10 a modified form of such magnetization.

Referring now to the form of FIGS. 6 to 8, it will be noted that magnetized pole areas M comprise two diametrically opposite, circumferential segments each covering approximately 135° of arc. As best shown in FIGS. 7 and 8, these pole areas are defined longitudinally by the dotted lines, said pole areas lying in helical relation to the axis of the stator. In this way, the field flux is skewed or progressively longitudinally offset relative to the armature.

In the form of FIGS. 9 and 10, the pole areas M' are longitudinally parallel with the axis of the stator, and the flux density is circumferentially progressively reduced, as shown at R, in opposite directions from a central area of maximum flux density defined by the dimension X. In these less magnetized areas, the degree of magnetization is gradually diminished to produce the effect of physically tapered pole tips. The tapering effect may be produced at one or both of the longitudinal edges of the pole areas, and said pole areas may be either longitudinally straight as shown in FIG. 10 or skewed as shown in FIG. 7.

Figure 4:
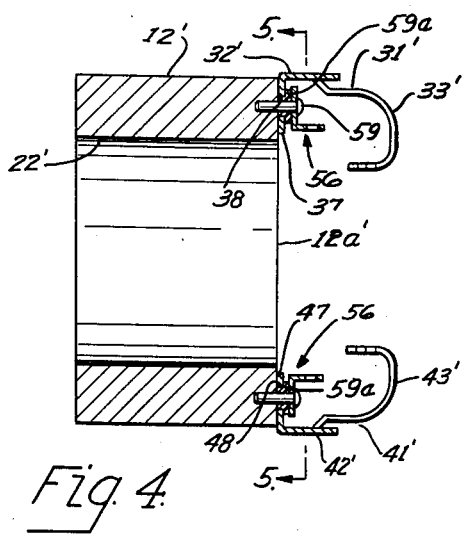
FIG. 4 is a longitudinal section of a modified motor stator.
Figure 5:
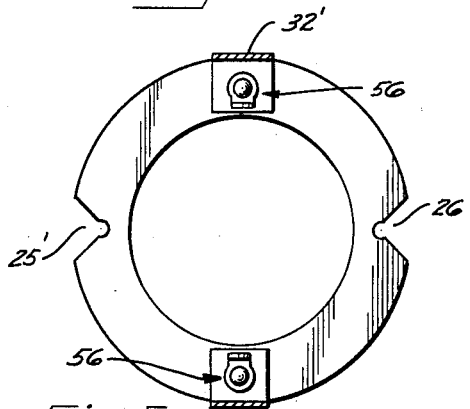
FIG. 5 is a view taken along the line 5—5 of FIG. 4.

In FIGS. 4 and 5, we show a modification of the stator of FIGS. 1 to 3. In this second form, the stator 12' is similar to construction to the stator 12 in that it is cylindrically formed having a longitudinal bore or aperture 22' and longitudinally disposed, V-shaped grooves 25' and 26'. It will be noted, however, that the flat grooves 23 and 24 of the first embodiment have not been included in the second form, and the brush supports 31 and 41 have been modified as shown at 31' and 41'.

In the form of FIG. 4, the brush support 31' comprises a short body portion 32' and a hook 33'. The hook 33' is identical with the hook 33, but the short body portion 32' is provided with a right angularly, radially inwardly directed foot 37 having an aperture 38 therethrough. In mounting the brush support 31', a lead support 56 is positioned with the body portion 57 parallel to the outwardly directed surface of the foot 37, the leg 58 being preferably directed longitudinally outwardly from the transverse surface 12a' of the stator 12'. The rivet 59 projects through the aperture 57a in the body portion 57 and through a flange insulating grommet 59a positioned within the aperture 38 in the foot 37 of the brush support whereby said brush support and said lead support are insulated from each other. The rivet 59 is pressed or driven into the transverse, forwardly directed surface 12a' of the stator 12'.

The brush support 41' is identical with the brush support 31', having a hook 43', a body portion 42', and a foot portion 47 apertured at 48. Said brush support 41' is mounted upon the stator 12' in conjunction with a lead support 56 by means of a rivet 59 and a flanged insulating grommet 59a in the same manner as the brush support 31'.

The above embodiments of our invention as shown in FIGS. 1 to 3 and 4 to 5 have certain outstanding advantages over conventionally constructed motors or generators. Expensive wound field coils are eliminated, and many time-consuming steps in manufacture of the same are avoided. There is no need to provide especially formed pole tips since the pole areas are created in the magnetizing process. Wiring of the present motor is greatly simplified by the stator being a permanent magnet and a nonconductor. As has been shown, the brush leads can be mounted directly to the stator. Also, because the stator is permanently magnetized and is not dependent upon electrical current for its magnetization, said stator maintains a constant flux density during operation.

It will be understood that many departures from the details of our invention as it is herein described and illustrated may be made, such as changes in size and dimension, without, however, departing from the spirit of our invention or the scope of the appended claims.

What we claim is:

1. An electric motor comprising a stator and an armature adapted to rotate within said stator, said stator comprising essentially a mixture of barium and iron oxides compacted to a solid mass, said stator being permanently magnetized at circumferentially interspaced portions to form pole areas, said pole areas being longitudinally helically directed in relation to the axis of said stator.

2. An electric motor comprising a stator and an armature adapted to rotate within said stator, said stator being a circumferentialy continuous, barium ferrite permanent magnet having a flat end surface, a pair of brushes adapted to resiliently contact said armature to deliver current thereto, leads to said brushes, brush supports secured to said flat end surface of said stator, lead supports unitarily mounted with said brush supports, and rivet means projecting through said brush supports and said lead supports and into said stator to unitarily secure the recited parts together.

3. An electric motor comprising a stator and an armature adapted to rotate within said stator, brushes adapted to resiliently contact said armature to deliver current thereto, leads to said brushes, brush supports having apertured mounting portions adapted to be riveted to one end of said stator, apertured lead supports, insulating means between said lead supports and said brush supports, and rivet means projected through said aperture and driven into said stator for unitarily mounting said mounting portions of said brush supports and said lead supports to said stator.

4. A circumferentially continuous stator for an electric motor or generator comprised of barium and iron oxides compacted to a solid mass, said stator being apertured to provide a smooth, cylindrical bore adapted to receive an armature, portions of the circumference of said stator being permanently magnetized to form pole areas, said pole areas being circumferentially interspaced, said stator having other non-magnetized portions interspaced between said magnetized portions, the recited pole areas being longitudinally helical in relation to the axis of said stator.

References Cited in the file of this patent

UNITED STATES PATENTS

| | | |
|---|---|---|
| 285,547 | Ball | Sept. 25, 1883 |
| 444,807 | Beach | Jan. 20, 1891 |
| 460,125 | Fink | Sept. 29, 1891 |
| 1,756,332 | Becker | Apr. 29, 1930 |
| 1,997,193 | Kato | Apr. 9, 1935 |
| 2,387,073 | Horlacher | Oct. 16, 1945 |
| 2,450,982 | O'Brien | Oct. 12, 1948 |
| 2,516,901 | Morrill | Aug. 1, 1950 |
| 2,629,061 | Swarthout | Feb. 17, 1953 |
| 2,722,617 | Cluwen | Nov. 1, 1955 |
| 2,774,896 | Reynst | Dec. 18, 1956 |
| 2,779,885 | Reynst | Jan. 29, 1957 |
| 2,780,744 | Carneck | Feb. 5, 1957 |
| 2,792,510 | DeWolf | May 14, 1957 |
| 2,894,156 | Kent | July 7, 1959 |
| 2,981,855 | Van Lieshout | Apr. 25, 1961 |

FOREIGN PATENTS

| | | |
|---|---|---|
| 760,269 | Great Britain | Oct. 31, 1956 |